United States Patent
Jung (10) Patent No.: US 9,775,033 B2
(45) Date of Patent: Sep. 26, 2017

(54) METHOD AND APPARATUS FOR CONNECTING WIRELESS LAN ON MULTI SIM TERMINAL

(71) Applicant: Samsung Electronics Co., Ltd., Gyeonggi-do (KR)

(72) Inventor: Buseop Jung, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 14/554,457

(22) Filed: Nov. 26, 2014

(65) Prior Publication Data

US 2015/0146707 A1    May 28, 2015

(30) Foreign Application Priority Data

Nov. 27, 2013   (KR) .................. 10-2013-0145687

(51) Int. Cl.
*H04W 12/06*   (2009.01)
*H04W 88/06*   (2009.01)
*H04W 84/12*   (2009.01)
*H04W 48/18*   (2009.01)
*H04W 8/18*    (2009.01)
*H04L 29/06*   (2006.01)

(52) U.S. Cl.
CPC .......... *H04W 12/06* (2013.01); *H04W 48/18* (2013.01); *H04W 84/12* (2013.01); *H04W 88/06* (2013.01); *H04L 69/14* (2013.01); *H04W 8/183* (2013.01)

(58) Field of Classification Search
CPC ..... H04W 12/06; H04W 48/18; H04W 84/12; H04W 8/183
See application file for complete search history.

(56) References Cited

U.S. PATENT DOCUMENTS

| | | | |
|---|---|---|---|
| 2008/0064443 A1* | 3/2008 | Shin ................. | H04M 1/72519 455/558 |
| 2008/0161049 A1 | 7/2008 | Lagnado et al. | |
| 2008/0220773 A1* | 9/2008 | Buckley ............... | H04W 48/18 455/433 |
| 2011/0265146 A1 | 10/2011 | He | |
| 2012/0264402 A1 | 10/2012 | Zhang et al. | |
| 2013/0303203 A1* | 11/2013 | Wang ................... | H04W 68/00 455/458 |
| 2014/0245391 A1* | 8/2014 | Adenuga ................ | G06F 21/34 726/3 |

FOREIGN PATENT DOCUMENTS

NL     WO2013006493     *  5/2013

* cited by examiner

*Primary Examiner* — Mohammad Anwar
(74) *Attorney, Agent, or Firm* — The Farrell Law Firm, P.C.

(57) ABSTRACT

A method and an apparatus for operating a subscriber identity module (SIM) card in order to perform effective wireless local area network (LAN) connection by a multi SIM terminal is provided. The method includes searching for a wireless LAN; identifying whether there is a SIM card corresponding to the wireless LAN; and when it is identified that there is the SIM card corresponding to the wireless LAN, and the SIM card corresponding to the wireless LAN is unselected, connecting a communication channel with the wireless LAN using information on the unselected SIM card.

23 Claims, 7 Drawing Sheets

METHOD AND APPARATUS FOR CONNECTING WIRELESS LAN ON MULTI SIM TERMINAL

PRIORITY

This application claims priority under 35 U.S.C. §119(a) to Korean Patent Application Serial No. 10-2013-0145687, which was filed in the Korean Intellectual Property Office on Nov. 27, 2013, the entire content of which is incorporated herein by reference.

BACKGROUND OF THE INVENTION

1. Field of the Invention

The present invention generally relates to an operation of a subscriber identity module (SIM) card for use in an efficient connection of a wireless local area network (LAN) in a multi SIM terminal.

2. Description of the Related Art

A multi SIM terminal can use several phone numbers. The multi SIM terminal may support use of several phone numbers by inserting two or more subscriber identification module (SIM) cards therein. Generally, the multi SIM terminal activates and uses one of several SIM cards which are mounted thereon, or configures, as a selected SIM card, one of a plurality of activated SIM cards when being in a multi-standby state and uses the configured activated SIM card. The multi SIM terminal may provide a user interface (UI) to easily select the SIM cards.

A new technology for accessing a wireless LAN is expected to become commercially available. A representative technology is called a Hotspot 2.0, in which a multi SIM terminal can automatically access the wireless LAN even though a user does not input any data. The Hotspot 2.0 is a system in which information on an access to a network can be acquired through an external information server and which employs a scheme of a server authentication and an automatic connection through the information of the SIM card. However, the technology of the automatic access to the network, such as the Hotspot 2.0, prescribes only a scheme of a specific server authentication, and does not separately prescribe a scheme of the network connection in the multi SIM terminal. Accordingly, in the conventional multi SIM terminal considering only the selected SIM card, when a SIM card is in an unselected state even when the SIM capable of accessing the wireless LAN is mounted on the multi SIM terminal, the automatic access to the LAN may not be performed. Thus, a user may be inconvenienced.

SUMMARY OF THE INVENTION

The present invention has been made to solve the above-mentioned problem and/or disadvantages and to provide at least advantages described below. Accordingly, an aspect of the present invention is to provide a method and an apparatus for connecting wireless LAN on a multi SIM terminal, which are capable of performing an automatic access to the wireless LAN based on all SIM cards regardless of whether the SIM cards in the multi SIM terminal is selected.

In accordance with an aspect of the present invention a method of connecting a wireless LAN on a multi SIM terminal is provided. The method includes searching for a wireless LAN; identifying whether there is a SIM card corresponding to the wireless LAN; and when it is identified that there is the SIM card corresponding to the wireless LAN, and the SIM card corresponding to the wireless LAN is unselected, connecting a communication channel with the wireless LAN using information on the unselected SIM card.

In accordance with another aspect of the present invention, a multi SIM terminal is provided. The multi SIM terminal includes a plurality of SIM cards; a controller configured to search for a wireless LAN, and when a SIM card corresponding to a connectable wireless LAN is unselected, to perform authentication of the wireless LAN using the unselected SIM card; and a wireless communication unit configured to connect a communication channel with the connectable wireless LAN network under a control of the controller.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. It should be noted that the same elements will be designated by the same reference numerals although they are shown in different drawings. Further, detailed descriptions related to well-known functions or configurations capable of making subject matters of the present invention unnecessarily obscure will be omitted.

Meanwhile, embodiments of the present invention shown and described in this specification and the drawings correspond to specific examples presented in order to easily explain technical contents of the present invention, and to help comprehension of the present invention, but are not intended to limit the scope of the present invention. It will be apparent to those having ordinary knowledge in the technical field, to which the present invention pertains, that it is possible to practice other modified embodiments based on the technical idea of the present invention as well as the embodiments disclosed herein.

In an embodiment of the present invention, a SIM card refers to a subscriber identification card, which is a device for storing user authentication information for use in a specific wireless communication network.

In an embodiment of the present invention, an International Mobile Station Identify (IMSI) is a proper identification number allocated to a mobile multi SIM terminal in a subscription to a mobile communication system service. The IMSI is stored in the SIM card, and includes a Public Land Mobile Network (PLMN).

In an embodiment of the present invention, the PLMN refers to a proper classification code of a mobile communication provider.

Further, the method of connecting the wireless LAN of the multi SIM terminal according to an embodiment of the present invention discloses a process of connecting a communication channel to a connectable wireless LAN network by selecting an unselected SIM card when the unselected SIM card and the connectable wireless LAN network are searched for.

The method and apparatus for connecting the wireless LAN on the SIM card according to an embodiment of the present invention support a search for the accessible wireless LAN by using information of all SIM cards mounted on the multi SIM terminal. Accordingly, the present invention can maximize use of the wireless LAN of the multi SIM terminal.

Figure 1:
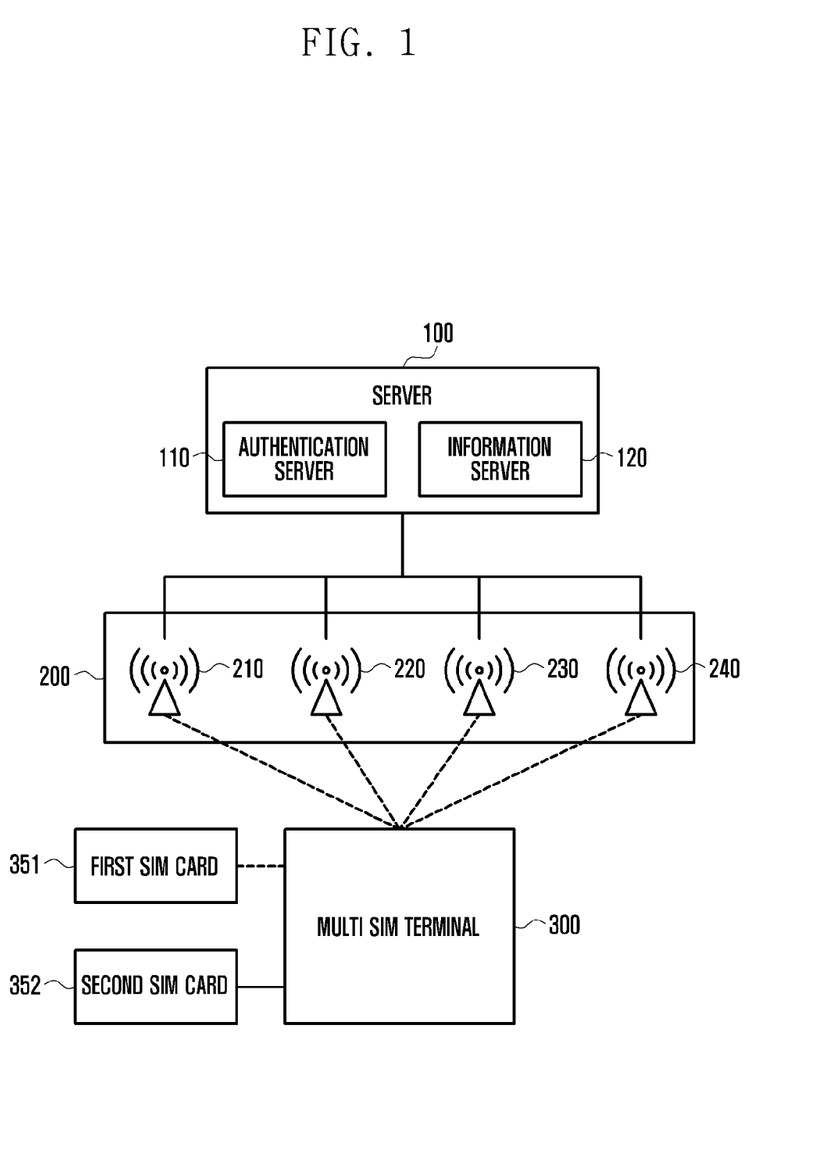
FIG. 1 illustrates a wireless LAN connecting system according to an embodiment of the present invention.

FIG. 1 is illustrates a wireless LAN connecting system according to an embodiment of the present invention.

The wireless LAN connecting system according to the embodiment of the present invention includes a multi SIM terminal 300 for supporting a connection of the wireless LAN to a server 100, and access points (APs) 200. The server 100 includes an authentication server 110 and an information server 120. Further, the multi SIM terminal 300 includes a first SIM card 351 and a second SIM card 352.

The embodiment of the present invention may be performed based on the wireless LAN, for example, Wi-Fi, supporting a specific network standard. The specific standard may be a means, for example, a Hotspot 2.0, which can allow the multi SIM terminal 300 to perform authentication through a reception of network connection information from the information server 120 in the connection of the wireless LAN. The network connection information may include information related to a scheme of authenticating the PLMN and the server.

The multi SIM terminal 300 performs a process of searching for the APs 200 around the SIM terminal 300 when trying to access the wireless LAN. Through the process, the multi SIM terminal 300 searches for the APs 200 around the multi SIM terminal 300, and acquires a Service Set Identifier (SSID) of the AP. For example, as a result of the search, the multi SIM terminal 300 searches for a first AP 210, a second AP 220, a third AP 230, and a fourth AP 240. Further, the multi SIM terminal 300 displays the SSID of each of the APs 200 which are acquired, on a screen thereof. Then, the multi SIM terminal 300 identifies an AP, which supports the specific standard, e.g., the Hotspot 2.0, and attempts to access the network through the reception of the information from the information server 120, among the discovered APs 200. For example, if only the first AP 210 among the discovered APs 200 supports the specific standard, e.g., the hotspot 2.0, the multi SIM terminal 300 attempts to access the first AP 210 for the network connection. In this event, the multi SIM terminal 300 receives the network connection information from the information server 120 for the network connection. Moreover, the multi SIM terminal 300 compares the IMSI included in the SIM card information read from the first and second SIM cards 351 and 352, and the PLMN included in the network connection information received from the information server 120. Through the comparison, the multi SIM terminal 300 identifies whether there is an SIM card which has the IMSI related to the PLMN. For example, when only the second SIM card 352 has the IMSI corresponding to the PLMN, the multi SIM terminal 300 identifies whether the second SIM card 352 is selected and activated. If the second SIM card 352 is selected and activated in the multi SIM terminal 300, the multi SIM terminal 300 requests the authentication server 110 for the authentication. When the second SIM card 352 is selected and activated in the multi SIM terminal 300 and only the first SIM card 351 corresponds to the PLMN, that is, the first SIM card 351, which corresponds to the PLMN, is unselected and inactivated, the multi SIM terminal 300 temporarily activates the first SIM card 351. Then, the multi SIM terminal 300 temporarily performs a server authentication process using the first SIM card 351, which is unselected. Further, when performing the server authentication process using the unselected SIM card, in a single standby mode, the multi SIM terminal 300 performs the server authentication by temporarily activating the unselected SIM card, and when the wireless LAN connection is completed, the multi SIM terminal 300 deactivates the unselected SIM card. Accordingly, when performing the server authentication process using the unselected SIM card in a multi standby mode, the multi SIM terminal 300 can perform the server authentication using the unselected SIM card without changing activated states of the SIM cards.

Figure 2:
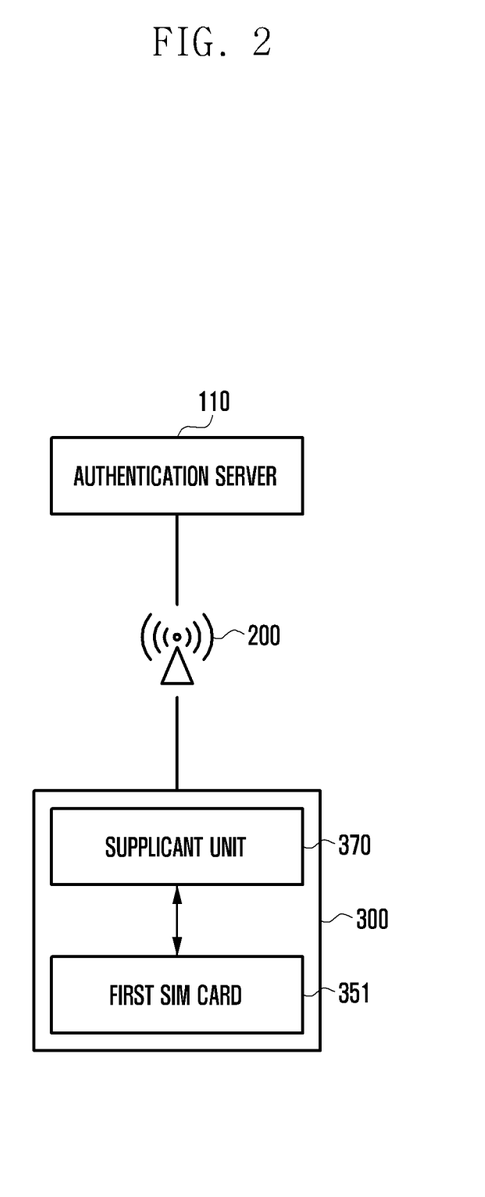
FIG. 2 illustrates a wireless LAN authentication system according to an embodiment of the present invention.

FIG. 2 illustrates a wireless LAN authentication system according to an embodiment of the present invention.

The wireless LAN authentication system according to the embodiment of the present invention includes the authentication server 110, the AP 200, and the multi SIM terminal 300. The multi SIM terminal 300 includes a supplicant unit 370 for requesting the authentication server 110 for the authentication. In addition, the multi SIM terminal 300 may be provided with two or more SIM cards. However, for convenience of description, it is assumed that the multi SIM terminal 300 includes only the first SIM card 351 in FIG. 2. Typically, the supplicant refers to a client and a user device which intends to access the network. However, hereinafter, the supplicant unit 370 will be expressed as an element which plays a role of requesting of the authentication in the multi SIM terminal 300.

When the multi SIM terminal 300 attempts to access the wireless LAN, the supplicant unit 370 performs a basic process for the server authentication according to a specific security standard. The wireless LAN network access scheme (Hotspot 2.0) according to the embodiment of the present invention uses a security standard of EAP-SIM/AKA/AKA'. The security standard of EAP-SIM/AKA/AKA' is a scheme in which the server authentication (network authentication) for network connection is performed by using the SIM card. Accordingly, the supplicant unit 370 communicates with the authentication server 110 by using the first SIM card 351 in the network connection according to the embodiment of the present invention.

The supplicant unit 370 of the multi SIM terminal performs a basic authentication process in order to receive the authentication from the authentication server 110. Further, the authentication process is achieved by cryptographic authentication through an encryption process in the first SIM card 351. That is, the supplicant unit 370 performs communication with the first SIM card 351 in order to receive the authentication from the authentication server 110. When the cryptographic authentication is completed as the supplicant unit 370 performs the communication with the first SIM card 351, the authentication server 110 performs the authentication while the multi SIM terminal 300 accesses the wireless LAN through the authentication process.

Figure 3:
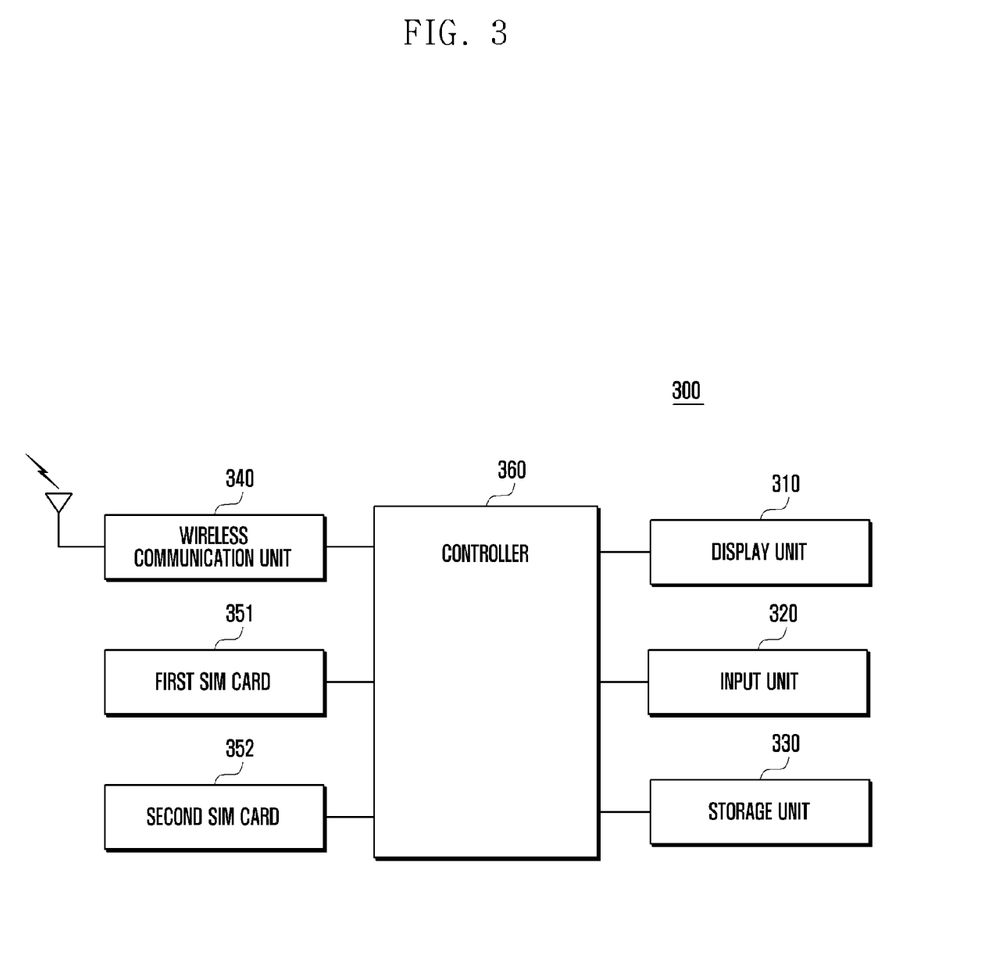
FIG. 3 illustrates a configuration of a multi SIM terminal according to an embodiment of the present invention.

FIG. 3 illustrates a configuration of a multi SIM terminal according to an embodiment of the present invention.

Referring to FIG. 3, the multi SIM terminal 300 according to an embodiment of the present invention includes a display unit 310, an input unit 320, a storage unit 330, a wireless communication unit 340, a first SIM card 351, a second SIM card 352, and a controller 360.

The display unit 310 may include a Liquid Crystal Display (LCD) unit, an Organic Light Emitting Diodes (OLED) unit, an Active Matrix Light Emitting Diodes (AMOLED), and the like, which visually provides various kinds of information such as a menu of the multi SIM terminal 300, input data, information on setting of functions, and the like. The display unit 310 according to the embodiment of the present invention displays a list of the SIM cards when a user wants to select a SIM card to be activated in the multi SIM terminal. The multi SIM terminal 300 activates a specific SIM card according to the selection of the user. The display unit 310 displays the activated SIM card in the list of the SIM cards mounted on the multi SIM terminal 300 in response to the selection of the user. Further, the display unit 310 displays a list of the APs 200 around the multi SIM terminal 300 when the user requests of the network access information.

The input unit 320 may include a touch panel and a key input unit. The input unit receives a touch event, a key input event, and the like, of the user on the multi SIM terminal and transmits the events to the controller 350. The input unit 320 according to the embodiment of the present invention receives information on the selection of the user, in which a specific SIM card is selected from a plurality of SIM cards provided to the multi SIM terminal 300, in order to activate the selected SIM card.

The storage unit 330 plays a role of storing data and programs required to operate the multi SIM terminal. Further, the storage unit 330 may include the SIM card, but for convenience of description, the SIM card will be separately described. The storage unit 330 according to the embodiment of the present invention stores a list of the SSIDs of the APs 200, which the SIM terminal has scanned and accessed when having accessed the network. Furthermore, the storage unit 330 stores information on the SIM cards, which is extracted from all the SIM cards mounted on the multi SIM terminal 300 when the multi SIM terminal 300 is booted.

The wireless communication unit 340 performs a voice call, a video call, or data communication with an external device through the network. The wireless communication unit 340 includes a wireless frequency transmission unit for upward-converting and amplifying a frequency of a transmitted signal, and a wireless frequency reception unit for downward-converting and low-noise amplifying a frequency of the received signal. Furthermore, the wireless communication unit may include a mobile communication module, a digital broadcasting module, a Bluetooth communication module, and the like. The wireless communication unit 340 according to the embodiment of the present invention is provided with a wireless LAN module for the wireless LAN connection. The wireless communication unit 340 performs a scanning process of searching for the APs 200 around the multi SIM terminal 300 by using the wireless LAN module, when the user requests the multi SIM terminal 300 to access the wireless LAN. In addition, the wireless communication unit 340 performs a request of the network access information. In the process of requesting of the network access information, the wireless communication unit 340 receives the network access information, e.g., the PLMN, the server authentication scheme, and the like, related to the detected wireless LAN from the information server 120.

The first and second SIM cards 351 and 352 are mounted on the multi SIM terminal 300, which are chips capable of storing the SIM card information including a phone number and an identifier of a subscriber. The multi SIM terminal 300 according to the embodiment of the present invention may include two or more SIM cards. However, for convenience of the description, it is assumed that the multi SIM terminal 300 is provided with two SIM cards. The controller 360 activates and uses a specific one of the first and second SIM cards 351 and 352. That is, the multi SIM terminal 300 operates in a state that only the specific one of all the provided SIM cards is activated and the remaining cards are inactivated. The multi SIM terminal 300 according to the embodiment of the present invention extracts the IMSI from all the provided SIM cards regardless of the activation, and stores the IMSI in the storage unit 330. The IMSI is information required for the server authentication when the multi SIM terminal accesses the network according to the embodiment of the present invention.

The controller 360 controls overall operations for driving the multi SIM terminal 300. The controller 360 extracts the SIM card information, e.g., the IMSI, from all the SIM cards mounted on the multi SIM terminal 300 when the multi SIM terminal 300 is booted according to the embodiment of the present invention. Further, the controller 360 controls the wireless communication unit 340 to perform the network access based on the extracted SIM card information and the received network access information. Further, the controller 360 compares the SIM card information with the network access information received form the server 100. More particularly, the controller 360 compares the PLMN in the network access information with the IMSI in the SIM card information. As a result of the comparison, if there is an IMSI corresponding to the PLMN, that is, there is a SIM card having the corresponding IMSI, the controller 360 identifies whether the SIM card is selected. When the corresponding SIM card is unselected, the controller 360 temporarily uses information on the unselected SIM card in order to perform the server authentication. For example, when the first and second SIM cards 351 and 352 are provided to the multi SIM terminal 300, and when the first SIM card 351 is the corresponding SIM card and is unselected, the controller 360 controls the wireless communication unit to perform the server authentication using information on the first SIM card 351 which is unselected.

In accordance with an embodiment of the present invention, the controller 360, in the single standby mode, activates only the selected SIM card and deactivates the unselected SIM card. In accordance with an embodiment of the present invention, the controller 360, in the multi standby mode, simultaneously activates a plurality of SIM cards provided regardless of whether the SIM cards is selected, and performs an authentication operation for a sending function and data communication connection using the selected SIM card. The multi SIM terminal 300 according to the embodiment of the present invention supports the single standby mode or supports both the single standby mode and the multi standby mode.

Figure 4A:
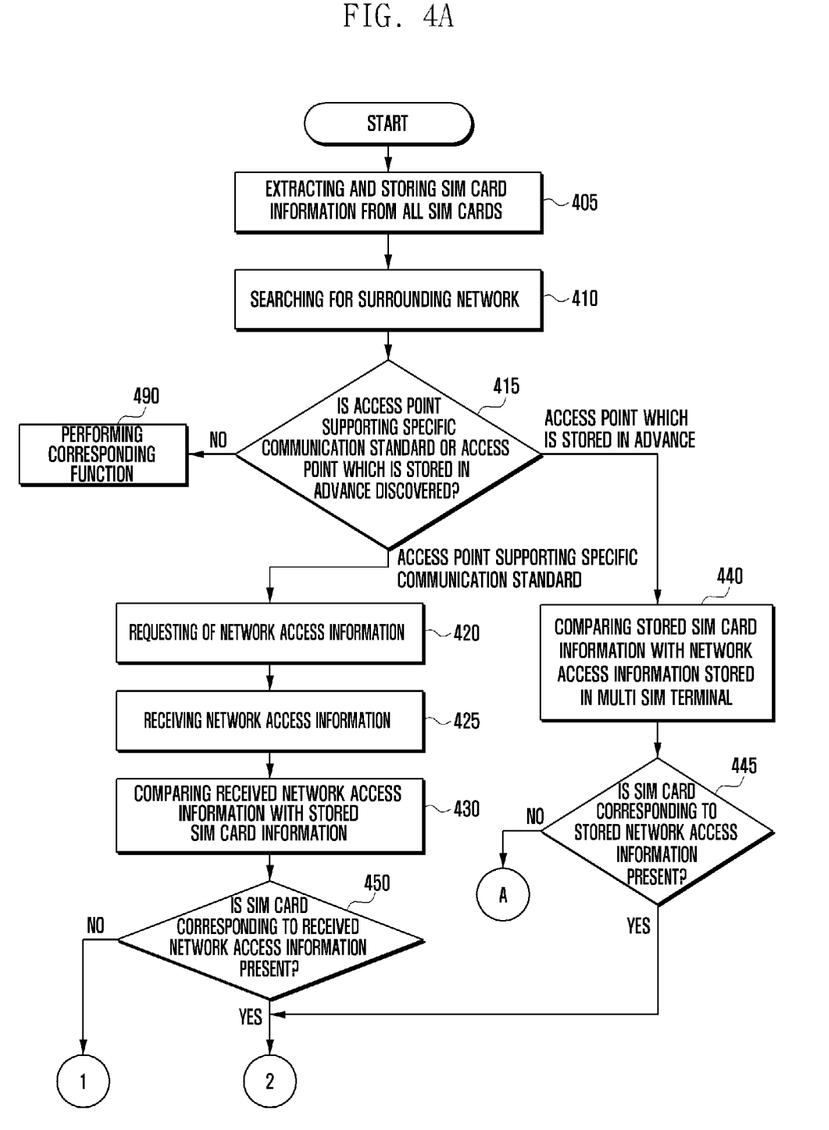
FIGS. 4A and 4B are flowcharts illustrating a process of connecting the wireless LAN on the multi SIM card according to an embodiment of the present invention.
Figure 4B:
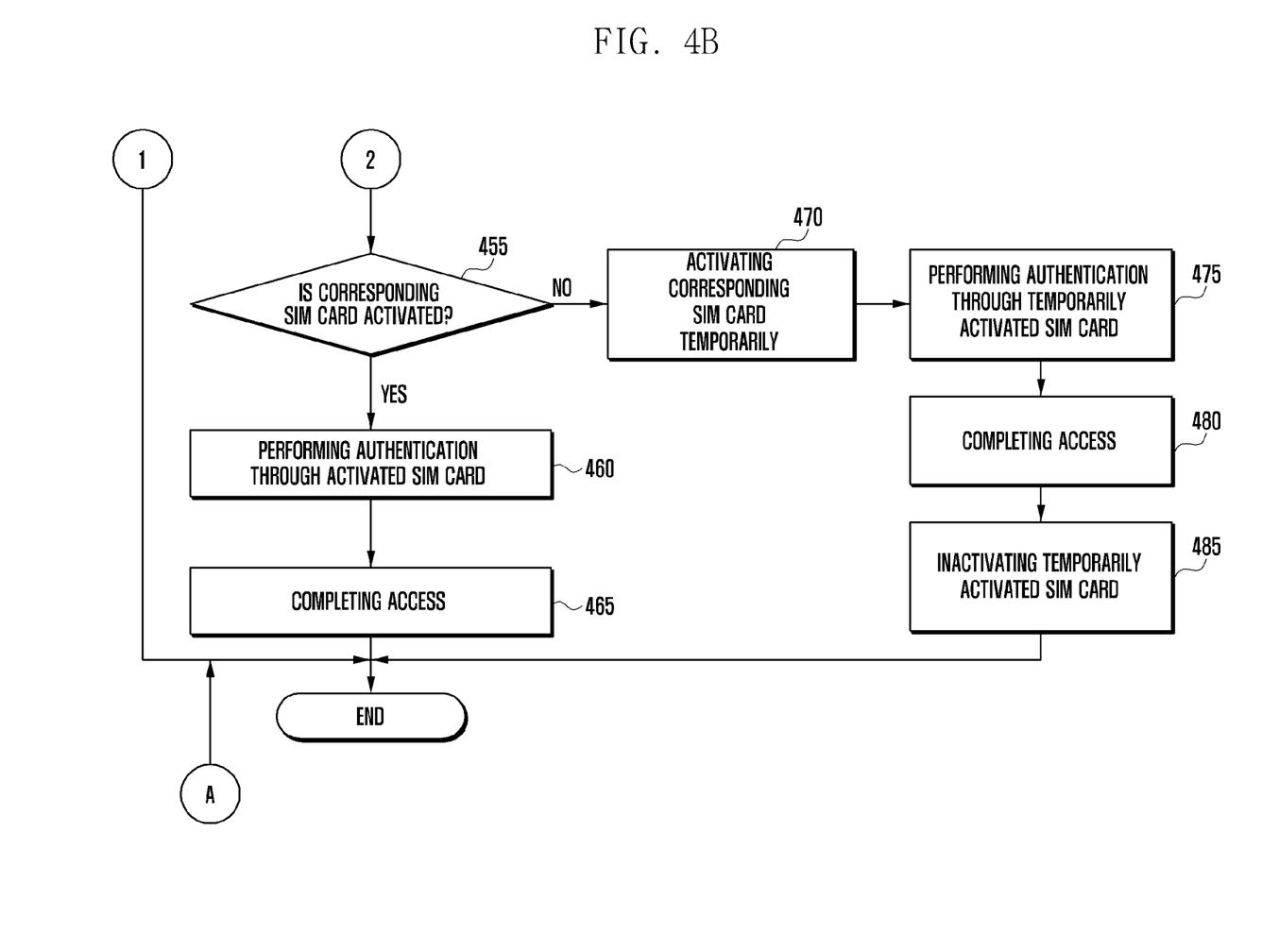

FIGS. 4A and 4B are flowcharts illustrating a process of connecting the wireless LAN on the multi SIM card according to an embodiment of the present invention.

The number of the SIM cards provided to the multi SIM terminal 300 according to the embodiment of the present invention is not limited. For convenience of the description, it is assumed that the multi SIM terminal 300 includes only the first and second SIM cards 351 and 352. Further, the following description, which is made with reference to FIGS. 4A and 4B, will be described on the basis of an operation driven in a multi SIM terminal which supports a single standby mode.

Here, a process of searching for the wireless LAN network and a process of activating the inactivated SIM card to perform a communication connection, when there are an inactivated SIM card and a connectable wireless LAN network, are described.

The controller 360 extracts and stores the SIM card information from all the SIM cards, e.g., the first and second SIM cards 351 and 352, included in the multi SIM terminal 300 in step 405. The SIM card information is user information including the IMSI. Although the controller 360 selects the SIM card to be activated when the multi SIM terminal 300 is booted, the multi SIM terminal 300 extracts the SIM card information from all the SIM cards mounted thereon, regardless of the activation state of the SIM cards. Further, the controller 360 may identify the stored SIM card information in step 405. At this time, the SIM card information may further include information on the activation of the SIM card. The SIM card information may be used to determine whether it is possible to perform connection to the wireless LAN.

The controller 360 controls the wireless communication unit 340 to search for the networks around the multi SIM terminal 300 in step 410. During the search for the networks, the controller 360 identifies the SSIDs of the APs 200 around the wireless communication unit 340, and the information on the standard supported by the APs 200 through the wireless communication unit 340. The information from this identification is used to identify whether the discovered network supports the specific standard, e.g., the Hotspot 2.0. Further, the controller 360 may identify the SSIDs of the APs 200 which are previously stored in the multi SIM terminal 300 during the search for the network in step 410. The SSIDs of the APs 200 which are stored may be the SSIDs of the APs 200 which the multi SIM terminal 300 has accessed through the specific server authentication scheme, e.g., EAP-SIM/AKA/AKA scheme. Alternatively, the SSIDs of the APs 200 which are stored may be the SSIDs of the APs 200 supporting the network provided by a telecommunication company. In addition, the multi SIM terminal 300 may store access information of the network supported by the APs 200. Accordingly, during the search for the networks in step 410, the controller 300 may identify the SSIDs of the APs 200, the server authentication scheme, and the connection information of the network supported by the APs 200 through the storage unit 330. The information from the identification may be used to identify whether there exist the APs 200, of which the SSIDs are stored in advance, around the multi SIM terminal.

The controller 360 identifies whether the APs 200 supporting the specific standard of the network, or the APs 200 of which the SSIDs are stored in advance are discovered, in step 415.

When it is identified that the AP, which is identical to the SSID of the AP 200 supporting the specific standard, e.g., Hotspot 2.0, or a pre-defined SSID of the AP which is stored, is not discovered, the controller 360 performs a corresponding function in step 490. For example, the controller 360 may perform an access to the wireless LAN through the cryptographic authentication scheme for the discovered AP 200 in step 490. Alternatively, the controller 360 may terminate the network access process in step 490.

When it is identified that the AP 200 supporting the network depending on the specific standard, the controller 360 requests the preset server, e.g., the information server 120, for the network information on the access to the AP 200 in step 420. According to the specific standard, a scheme may be specified as what allows the multi SIM terminal to receive the network connection information required for the connection of the network from the server 100 so as to support the automatic access to the wireless LAN.

The wireless communication unit 340 receives the network access information under a control of the controller 360 in step 425. The network access information includes the PLMN. That is, the wireless communication unit 340 receives the PLMN of the corresponding AP 200 according to the request of the network access information in step 425.

After receiving the network access information, the controller 360 compares the received network access information with the stored SIM card information in step 430. More particularly, the controller 460 compares the PLMN included in the network access information with the IMSI included in the SIM card information. The configuration of the IMSI includes the PLMN. Therefore, the controller 360 compares the PLMN received from the server with the IMSI, which is information extracted from the SIM card, and determines whether the PLMN corresponds to the IMSI.

After the comparing process, the controller 360 determines whether there is a SIM card corresponding to the network access information received from the server 100 in step 450. The corresponding SIM card refers to a SIM card which has SIM card information corresponding to the PLMN received from the server 100.

When it is identified that AP is identical to the SSID of the AP stored in advance, through the wireless communication unit 340 in step 415, the controller 360 compares the stored SIM card information with the network access information stored in the multi SIM terminal in step 440.

After the comparison, the controller 360 determines whether there exists a SIM card corresponding to the stored network access information in step 445. Similarly, the corresponding SIM card refers to a SIM card which includes SIM card information corresponding to the PLMN in the stored network access information.

As described above, if the AP supporting the network depending on the specific standard and the AP of which the SSID is stored in advance are discovered in step 415, the controller 360 may determine the AP to be connected according to an intensity of the network signal.

As described above, when the multi SIM terminal accesses the AP supporting the network depending on the specific standard, e.g., the hotspot 2.0, the controller 360 may receive the network access information through the wireless communication unit 340. When the multi SIM terminal accesses the AP of which the SSID is stored in advance, the controller 360 may compare the stored network information with the SIM card information extracted and stored from the SIM card. If it is determined that there is no SIM card corresponding to the network access information in steps 450 and 445, the controller 360 terminates the wireless LAN access process. Although it is not shown in the drawings, after terminating the wireless LAN access process, the controller 360 may perform an operation of searching for the APs 200 around the multi SIM terminal when a predetermined time lapses.

If it is determined in step 450 that there is a SIM card corresponding to the PLMN acquired from the server 100, the controller 360 performs a process of step 455 of FIG. 4B. Similarly, if it is determined in step 445 that there is a SIM card corresponding to the stored network access information, the controller 360 performs a process of step 455.

The controller 360 identifies the activation status of the corresponding SIM card in step 455. If the SIM card has been activated in the multi SIM terminal 300, the controller 360 performs the authentication for the access to the wireless LAN network through the activated SIM card in step 460. The description of the authentication scheme using the SIM card will be omitted because it has been described with reference to FIG. 2.

After the authentication, the controller 360 determines the access to the wireless LAN network in step 465.

If it is determined in step 455 that the corresponding SIM card is inactivated, the controller 360 temporarily activates the corresponding SIM card in step 470. The controller 360 may deactivate a selected SIM card which is activated, in response to temporarily activating an unselected SIM card.

The controller 360 performs the authentication through the temporarily activated SIM card in step 475.

After performing the authentication, the controller 360 determines the access to the network in step 480.

The controller 360 inactivates the temporarily activated SIM card in step 485. The controller 360 then terminates the processes of FIGS. 4A and 4B.

As described above, a method for performing wireless LAN connection, by an electronic device which supports the single standby mode, according to a multi SIM operation of the present invention is provided.

Figure 5:
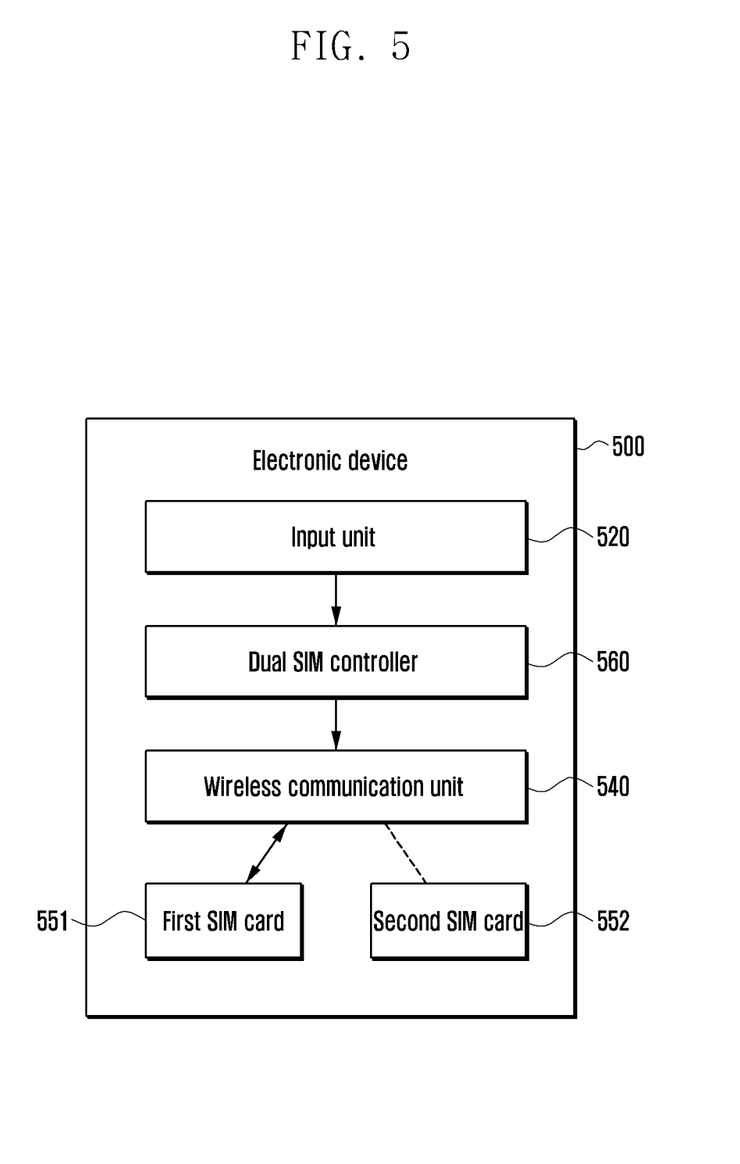
FIG. 5 is a block diagram illustrating an electronic device which supports a single standby mode according to an embodiment of the present invention.

FIG. 5 is a block diagram illustrating an electronic device which supports a single standby mode according to an embodiment of the present invention. An electronic device 500 illustrated in FIG. 5, which supports the single standby mode, includes two or more SIM cards, and activates only a specific selected SIM card.

When it is assumed that the electronic device 500 is an electronic device which includes two SIM cards and supports a single standby mode, a user can select a SIM card to be activated in the electronic device 500, through an input generated through an input unit 520 (e.g., a key, a touch panel, etc.). (In the single standby mode, the selected SIM card is activated.) For example, the first electronic device 500 displays a menu screen through which the user can select a SIM card to be activated from among a first SIM card 551 and a second SIM card. In this way, when the user selects the SIM card to be activated, information related to the selection is input through the input unit 520 and is then transferred to a dual SIM controller 560. Thereafter, the dual SIM controller 560 controls a wireless communication unit 540 to perform a communication function through the selected SIM card (e.g., the first SIM card 551) according to the information related to the selection. At this time, the dual SIM controller 560 processes an unselected SIM card (e.g., the second SIM card 552) into a deactivated state. Even when the second SIM card 552 is not deactivated through the dual SIM controller 560, the electronic device according to an embodiment of the present invention temporarily is activates the second SIM card 552 in order to perform network authentication using the second SIM card 552, and temporarily deactivates the first SIM card 551 which has been previously activated. Further, the electronic device 500 deactivates the second SIM card 552 again after temporarily activating the second SIM card to complete the server authentication for network communication connection.

Figure 6:
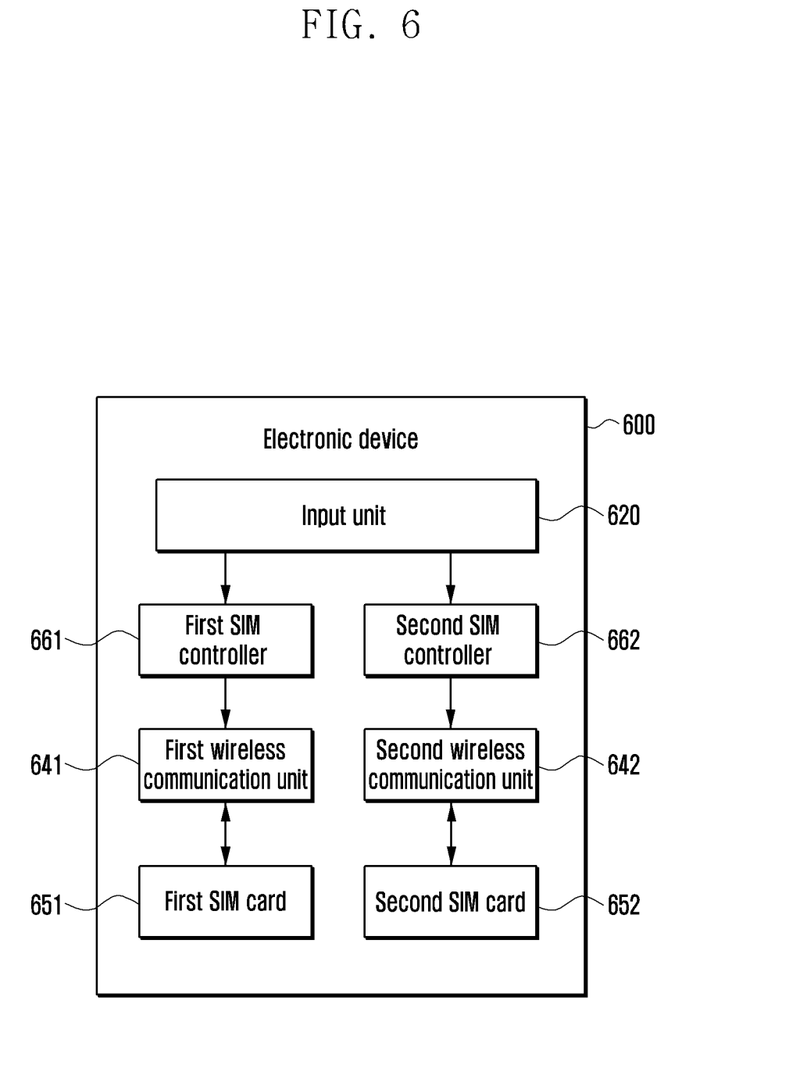
FIG. 6 is a block diagram illustrating an electronic device which supports a multi standby mode according to an embodiment of the present invention.

FIG. 6 is a block diagram illustrating an electronic device which supports a multi standby mode according to an embodiment of the present invention. The electronic device, which supports the multi standby mode, includes two or more SIM cards, and activates two or more or all of the provided SIM cards (makes two or more or all of the provided SIM cards be in a standby state).

When performing a sending function (e.g., call sending) or data communication connection, the electronic device 600, which supports the multi standby mode, is required to configure a priority relating to which SIM card's information will be used. In other words, although both a selected SIM card and an unselected SIM card of the electronic device 600 are activated, when performing the sending function and the data communication connection, the electronic device 600 performs the corresponding functions using information on the selected SIM card according to the priority.

Specifically, when including a first SIM card and a second SIM card as illustrated in FIG. 6, the electronic device 600 receives calls from two phone numbers corresponding to the two SIM card. In other words, the second electronic device 600 can receive an incoming call even when receiving a call from the phone number corresponding to the first SIM card 651 and can receive an incoming call even when receiving a call from the phone number corresponding to the second SIM card 652. However, in a situation where one specific SIM card should be used, such as phone call forwarding and the data communication connection, the selected SIM card may be preferentially used from among the plurality of SIM cards.

In this way, when performing the communication function using the SIM cards, the electronic device 600, which supports the multi standby mode, separately controls all the provided SIM cards. For example, when both the first SIM card 651 and the second SIM card 652 of the electronic device 600 are activated, and the first SIM card 651 is a selected SIM card therefrom, if an event for call forwarding (e.g., a data communication connection event) is generated, a first SIM controller 661 controls a first wireless communication unit 641 to perform communication channel connection using the first SIM card 651. When the second SIM card 652 of the electronic device 600 is the selected SIM card, if the data communication connection event is generated, a second SIM controller 662 controls a second wireless communication unit 642 to perform communication channel connection using the second SIM card 652. In this way, the electronic device 600, which supports the multi standby mode, can configure, as the selected SIM card, one of the plurality of provided SIM cards for priority and can use the configured SIM card.

The electronic device 600 performs wireless LAN connection regardless of whether a priority SIM card is configured, in a wireless LAN environment which supports a specific standard according to an embodiment of the present invention. For example, in the electronic device 600, which supports the multi standby mode, when the first SIM card 651 is a selected SIM card, and a wireless LAN having a specific standard coinciding with information on the second SIM card 652, the second SIM controller 662 performs authentication for wireless LAN connection using information on the second SIM card 652 corresponding to an unselected SIM card, regardless of whether SIM cards are selected.

That is, in the multi SIM terminal such as the electronic device 600, all of the SIM cards are in an activated state, and thus, activation states of the SIM cards need not to be changed to perform the wireless LAN connection. In accordance with an embodiment of the present invention, an operation for using information on the unselected SIM card is temporarily performed during wireless LAN connection which supports a specific standard.

The various embodiments of the present invention as described above may be implemented in the form of a program instruction that can be performed through various computers, and may be recorded in a computer readable recording medium. The computer readable recording medium may include a program command, a data file, and a data structure independently or in combination. The program instruction recorded in the recording medium is specially designed and constructed for the present invention, but may be well known to and may be used by those skilled in the art of computer software.

The computer readable recording media may include a magnetic media such as a hard disc, a floppy disc, and a magnetic tape, an optical recording media such as a Compact Disc Read Only Memory (CD-ROM) and a Digital Versatile Disc (DVD), a magneto-optical media such as a floptical disk, and a hardware device, such as a Read Only Memory (ROM), a Random Access Memory (RAM), and a flash memory, specifically configured to store and execute program instructions. Further, the program command includes a machine language code generated by a compiler and a high-level language code executable by a computer through an interpreter and the like. The aforementioned hardware device may be configured to operate as one or more software modules in order to perform the operation of the present invention, and vice versa.

Embodiments of the present invention disclosed in the specification and the drawings are only particular examples to easily describe the technical matters of the present invention and assist in the understanding of the present invention, and do not limit the scope of the present invention. Therefore, it should be construed that all modifications or modified forms drawn by the technical idea of the present invention in addition to the embodiments disclosed herein are included in the scope of the present invention. It will be understood by those skilled in the art that various changes in form and details may be made therein without departing from the spirit and scope of the invention as defined by the appended claims and their equivalents.

What is claimed is:

1. A method of connecting a wireless local area network (LAN) on a terminal operating in a single standby mode with multi subscriber identity module (SIM) cards, the method comprising:
    searching for a wireless LAN;
    identifying whether there is a SIM card corresponding to the wireless LAN;
    if the SIM card is identified as corresponding to the wireless LAN and is unselected, temporarily activating the unselected SIM card;
    performing authentication of the wireless LAN through the temporarily activated unselected SIM card; and
    connecting a communication channel with the wireless LAN using information on the unselected SIM card.

2. The method as claimed in claim 1, further comprising:
    extracting and storing SIM card information of multi SIM cards,
    determining if the SIM card information can be used to make a connection to the wireless LAN.

3. The method as claimed in claim 1, wherein searching for the wireless LAN comprises searching for at least one of access points supporting a specific standard or access points of which server set identifiers (SSIDs) are stored in advance.

4. The method as claimed in claim 3, wherein searching for the wireless LAN comprises:
    if the access point supporting the specific standard is discovered, requesting, from a server, network access information required for an access to a network corresponding to an access point; and
    receiving the network access information from the server.

5. The method as claimed in claim 4, wherein the specific standard is a communication standard in which the multi SIM terminal receives the network access information required for the access to the network from the server and supports an automatic access to the wireless LAN.

6. The method as claimed in claim 1, further comprising deactivating a selected SIM card which is activated, in response to temporarily activating the unselected SIM card.

7. The method as claimed in claim 6, wherein connecting the communication channel comprises, if the authentication through the temporarily-activated SIM card is completed, deactivating the temporarily-activated SIM card and activating the deactivated selected SIM card.

8. The method as claimed in claim 1, further comprising if the wireless LAN is a network connectable with a selected SIM card, performing authentication of the wireless LAN using the selected SIM card.

9. A method of connecting a wireless local area network (LAN) on a terminal operating in a multi standby mode with multi subscriber identity module (SIM) cards, the method comprising:
    searching for a wireless LAN; and
    identifying whether there is a SIM card corresponding to the wireless LAN,
    a selected SIM card and an unselected SIM card are activated, and
    if the SIM card corresponding to the wireless LAN is unselected, performing authentication of the wireless LAN using the unselected SIM card and connecting a communication channel with the wireless LAN using information on the unselected SIM card.

10. The method as claimed in claim 9, further comprising extracting and storing SIM card information of multi SIM cards,
    wherein the SIM card information is used to determine whether it is possible to make a connection to the wireless LAN.

11. The method as claimed in claim 9, wherein searching for the wireless LAN comprises searching for at least one of access points supporting a specific standard or access points of which server set identifiers (SSIDs) are stored in advance.

12. The method as claimed in claim 11, wherein searching for the wireless LAN further comprises:
    if the access point supporting the specific standard is discovered, requesting, from a server, network access information required for an access to a network corresponding to an access point; and
    receiving the network access information from the server.

13. The method as claimed in claim 12, wherein the specific standard is a communication standard in which the multi SIM terminal receives the network access information required for the access to the network from the server and supports an automatic access to the wireless LAN.

14. The method as claimed in claim 9, further comprising if the wireless LAN is a network connectable with a selected SIM card, performing authentication of the wireless LAN using the selected SIM card.

15. A multi subscriber identity module (SIM) terminal operating in a single standby mode comprising:
    a plurality of SIM cards; and
    a controller configured to search for a connectable wireless LAN, and if a SIM card corresponding to the connectable wireless LAN is unselected, temporarily activate the unselected SIM card, and perform authentication of the wireless LAN using the temporarily activated SIM card, and control a wireless communication unit configured to connect a communication channel with the connectable wireless LAN network.

16. The multi SIM terminal as claimed in claim 15, further comprising:

a storage unit configured to store SIM card information; and wherein the controller is further configured to determine if the SIM card information can be used to make a connection to the wireless LAN.

17. The multi SIM terminal as claimed in claim 15, wherein the controller is further configured to search for at least one of an access point which supports a specific standard and access points having a previously stored name.

18. The multi SIM terminal as claimed in claim 17, if the access point which supports the specific standard is discovered, the controller is further configured to request, from a server, network access information required for an access to a network corresponding to the access point, and receive the network access information from the server.

19. The multi SIM terminal as claimed in claim 17, wherein the specific standard is a communication standard in which the multi SIM terminal receives the network access information required for the access to the network from the server and supports an automatic access to the wireless LAN.

20. The multi SIM terminal as claimed in claim 15, wherein the controller is further configured to deactivate a selected SIM card which is activated, in response to temporarily activating the unselected SIM card.

21. The multi SIM terminal as claimed in claim 20, wherein if the network authentication through the temporarily-activated SIM card is completed, the controller is further configured to deactivate the temporarily-activated SIM card and activate the deactivated selected SIM card.

22. The multi SIM terminal as claimed in claim 15, wherein if the wireless LAN network is a network connectable with a selected SIM card, the controller is further configured to perform network authentication using the selected SIM card.

23. A multi subscriber identity module (SIM) terminal operating in a multi standby mode comprising:

a plurality of SIM cards;

a controller configured to search for a connectable wireless LAN;

a first wireless communication unit configured to perform a network function on the basis of information on a selected SIM card of the plurality of SIM cards; and a second wireless communication unit configured to perform a network function on the basis of information on an unselected SIM card of the plurality of SIM cards, wherein the controller is further configured to activate the selected SIM card and the unselected SIM card, and if the SIM card corresponding to the wireless LAN is unselected, the controller is further configured to control the second wireless communication unit to perform network authentication using the unselected SIM card.

* * * * *